United States Patent
Crawley et al.

(10) Patent No.: US 10,309,284 B2
(45) Date of Patent: Jun. 4, 2019

(54) METHOD OF REGENERATING AN EXHAUST GAS PURIFICATION FILTER, AND VAPORIZER

(75) Inventors: Wilbur Crawley, Nashville, IN (US); Tobias Danner, Neu-Ulm (DE); Wolfgang Hahnl, Grimma (DE); Jurgen Klement, Asbach-Baumenheim (DE); Marco Ranalli, Augsburg (DE); Barbara Lacher, Augsburg (DE)

(73) Assignee: FAURECIA EMISSIONS CONTROL TECHNOLOGIES, GERMANY GMBH (DE)

( * ) Notice: Subject to any disclaimer, the term of this patent is extended or adjusted under 35 U.S.C. 154(b) by 1293 days.

(21) Appl. No.: 12/993,256

(22) PCT Filed: Apr. 30, 2009

(86) PCT No.: PCT/EP2009/003154
§ 371 (c)(1),
(2), (4) Date: Feb. 9, 2011

(87) PCT Pub. No.: WO2009/141051
PCT Pub. Date: Nov. 26, 2009

(65) Prior Publication Data
US 2011/0120094 A1 May 26, 2011

(30) Foreign Application Priority Data
May 21, 2008 (DE) .................. 10 2008 024 470

(51) Int. Cl.
*F01N 9/00* (2006.01)
*B01D 53/94* (2006.01)
(Continued)

(52) U.S. Cl.
CPC ............. *F01N 9/00* (2013.01); *B01D 53/944* (2013.01); *B01D 53/96* (2013.01); *F01N 3/0253* (2013.01);
(Continued)

(58) Field of Classification Search
CPC ............. F01N 3/0253; F01N 2610/107; F01N 2610/10; F01N 2610/1453; F01N 3/36
(Continued)

(56) References Cited

U.S. PATENT DOCUMENTS 4,280,452 A * 7/1981 Kawamura et al. ........ 123/179.6
4,459,948 A * 7/1984 Bauer ........................ 123/145 A
(Continued)

FOREIGN PATENT DOCUMENTS

DE 102005049779 A1 4/2007
DE 102006025679 12/2007
(Continued)

OTHER PUBLICATIONS

International Search Report dated Dec. 8, 2009.
(Continued)

*Primary Examiner* — Audrey K Bradley
*Assistant Examiner* — Anthony Ayla Delgado
(74) *Attorney, Agent, or Firm* — Carlson, Gaskey & Olds, P.C.

(57) ABSTRACT

A method of regenerating an exhaust gas purification filter, in particular for internal combustion engines, uses a vaporized liquid that is to be introduced into the exhaust gas flow. A surface temperature of a heating element in a vaporizer chamber is limited to a maximum of 700 to 750° C.

19 Claims, 2 Drawing Sheets

(51) Int. Cl.
  *B01D 53/96* (2006.01)
  *F01N 3/025* (2006.01)
  *F01N 3/36* (2006.01)

(52) U.S. Cl.
  CPC ............ *F01N 3/36* (2013.01); *B01D 2251/21* (2013.01); *B01D 2258/012* (2013.01); *B01D 2258/014* (2013.01); *F01N 2240/16* (2013.01); *F01N 2610/03* (2013.01); *F01N 2610/10* (2013.01); *F01N 2610/107* (2013.01); *Y02T 10/47* (2013.01)

(58) Field of Classification Search
  USPC .......................................... 60/303, 286, 295
  See application file for complete search history.

(56) References Cited

U.S. PATENT DOCUMENTS

| | | | | |
|---|---|---|---|---|
| 4,567,725 | A * | 2/1986 | Shinzawa et al. | 60/274 |
| 4,576,617 | A * | 3/1986 | Renevot | 95/279 |
| 4,622,811 | A * | 11/1986 | Distel et al. | 60/303 |
| 6,590,185 | B2 * | 7/2003 | Kasimirski | F23Q 7/001 |
| | | | | 123/145 A |
| 7,010,909 | B2 * | 3/2006 | Ranalli et al. | 60/286 |
| 7,470,875 | B1 * | 12/2008 | Wilcox | F02C 7/266 |
| | | | | 219/260 |
| 2002/0142198 | A1 * | 10/2002 | Towler et al. | 429/17 |
| 2005/0120708 | A1 * | 6/2005 | Ranalli | F01N 3/0253 |
| | | | | 60/283 |
| 2006/0049163 | A1 * | 3/2006 | Gotoh et al. | 219/270 |
| 2008/0149613 | A1 * | 6/2008 | Ishinada | F23Q 7/001 |
| | | | | 219/267 |
| 2009/0127511 | A1 | 5/2009 | Bruck et al. | |
| 2009/0140068 | A1 * | 6/2009 | Ranalli | F01N 3/208 |
| | | | | 239/13 |
| 2009/0151338 | A1 * | 6/2009 | Li | F01N 3/204 |
| | | | | 60/295 |
| 2009/0184101 | A1 * | 7/2009 | Hoffman et al. | 219/270 |
| 2009/0301070 | A1 | 12/2009 | Klement | |

FOREIGN PATENT DOCUMENTS

| | | |
|---|---|---|
| DE | 102006025679 A1 | 12/2007 |
| JP | 62189375 A * | 8/1987 |
| JP | H07208150 A | 8/1995 |
| WO | 2003026777 A | 4/2003 |
| WO | 2007131784 | 11/2007 |

OTHER PUBLICATIONS

International Preliminary Report on Patentability dated Dec. 6, 2010.
Emission Control Technologies for Diesel-Powered Vehicles, Dec. 2007, Manufacturers of Emission Controls Association.
German Office Action for German Application No. 10 2008 024 470.8 dated Oct. 26, 2018.

* cited by examiner

METHOD OF REGENERATING AN EXHAUST GAS PURIFICATION FILTER, AND VAPORIZER

RELATED APPLICATION

This application is the U.S. national phase of PCT/EP2009/003154, filed 30 Apr. 2009, which claims priority to German Application No. 10 2008 024 470.8, filed 21 May 2008.

BACKGROUND

The present invention relates to a method of regenerating an exhaust gas purification filter of an internal combustion engine using a vaporized liquid to be introduced into the exhaust gas flow. The present invention furthermore relates to a vaporizer for carrying out the method according to the invention.

In diesel engines or gasoline engines driven by a lean mixture (e.g. gasoline direct injection engines), suitable particulate filters are employed for the reduction of the particulate emissions. These particulate filters need to be regenerated from time to time by burning off the particles accumulated on the filter surface. To this end, an oxidation catalytic converter is connected upstream of the particulate filter, the oxidation catalytic converter generating, by oxidation of an oxidizable substance present in the exhaust gas, the heat required for burning off the soot particles.

For regeneration of a particulate filter, it is therefore necessary from time to time to enrich the exhaust gas with an oxidizable substance, usually fuel. In addition to post-injection into the combustion chamber of the engine, systems are known for this purpose that use an additional high pressure fuel injection valve which is arranged in the manifold area of the exhaust system. Further known are systems having a metering pump which feeds a particular amount of fuel from the tank or from a low pressure fuel pipe into a heating chamber of a vaporizer (vaporizer chamber), where the fuel is vaporized and subsequently introduced into the exhaust gas flow.

The vaporizer systems usually operate with one or more glow plugs which are arranged in a vaporizer chamber to heat up and vaporize the fuel supplied. In the process, however, substances will become attached on a surface of the glow plug, which may result in a so-called "coking." Such coking appears to a particularly great extent when biodiesel is used.

SUMMARY

At least one heating element is positioned in a vaporizer chamber, and a liquid is fed into the vaporizer chamber. The heating element heats up and vaporizes the liquid, and a surface temperature of the heating element is controlled to a maximum of 750° C.

The heating element is heated up to a temperature that is significantly less than prior known configurations, in which temperatures as high as 900° C. occurred. In one example embodiment, the surface temperature of the heating element is controlled in an open loop or even in a closed loop and the temperature is limited to values at which no coking worth mentioning takes place any longer. Up to now, the temperatures used in the operation of the heating element have always been very high because the amount of fuel supplied also varies greatly, and it was intended to ensure a rapid vaporization even in the case of high mass flows. The subject configuration fundamentally deviates from this since, in the case of low mass flows, the heating power is now reduced.

As mentioned, the oxidizable liquid used is preferably fuel.

The heating element employed is more particularly one or more electric heating element(s), in which the electrical energy supplied is used for surface temperature control. Since the electrical energy is variable very quickly and simply, the surface temperature at the heating element can be influenced quickly and selectively in this way.

The heating element used in this connection is preferably one or a plurality of glow plugs. The glow plug technology is already known in another context, namely in diesel engine technology, and distinguishes itself by high ruggedness.

The electric heating element may also include a plurality of heating coils which, for controlling the surface temperature, carry different amounts of current by different amounts of energy being supplied to glow wires. This also allows the temperature in the vaporizer chamber to be very well controlled.

In this connection, the heating element may, for example, include at least one heating coil and a control coil connected upstream. The control coil is configured such that, depending on the temperature, the coil varies the resistance. Thus, the electric power available in the subsequent heating coil is varied.

The control coil may further change its resistance at a specific temperature or at specific temperatures.

If desired, the control coil may be the single controller for limiting the temperature of the heating element.

According to one example embodiment, provision is made that energy is supplied to the heating element as a function of an amount of liquid present in the vaporizer chamber and/or the liquid mass flow delivered through the vaporizer chamber. The greater the amount of liquid or the mass flow, the greater the amount of energy supplied.

Since the resistance of an electric heating element or of a part thereof (e.g., the control coil) increases as the temperature rises, this varying resistance may also be made use of for determining the temperature, if desired. A control of the surface temperature may be achieved in this way as well.

It should be appreciated that combinations of several variants of temperature control as described above and below or combinations of parameters which are taken into account in temperature control are also possible and advantageous.

The energy supplied to the heating element may be controlled by pulse width modulation, for example.

Further, it is, of course, also possible to use the amount of liquid supplied to the vaporizer chamber, i.e. the liquid mass flow, for temperature control.

For example, the liquid mass flow may be switchable between preset fixed values. Making use of this switchability, it can be determined from the start by tests, if required, which amounts of energy supplied must correspond to which mass flows, for the surface temperature to be near the desired values.

The vaporizer chamber has a liquid section and a vapor section, that is, one area each in which liquid and, respectively, vapor, are available. It would also be possible, for example, to arrange the heating element to be so variable in relation to the vaporizer chamber that its surface projects into the liquid section and the vapor section to a different, i.e. variable degree.

According to one example embodiment, the heating element or elements are arranged and designed in such a way that on their outer surface, they make more energy available in the liquid section than in the vapor section.

It is desirable for the surface temperature of the heating element to amount to a maximum of 700 to 750° in the operating condition, so that even maximum values of below 750° C., more precisely of between 700 and 750°, are fixed in advance as an upper limit.

The invention furthermore relates to a vaporizer of a vehicle exhaust gas purification device for carrying out the method according to the invention, including a vaporizer chamber, at least one heating element positioned in the vaporizer chamber, and a controller for the heating element which limits the surface temperature of the heating element to a maximum of 700 to 750°.

In one example embodiment, provision is made that the controller controls the energy supplied to the heating element as a function of the liquid mass flow.

BRIEF DESCRIPTION OF THE DRAWINGS

Further features and advantages of the invention will be apparent from the description below and from the accompanying drawings, to which reference is made and in which:

FIG. 2b shows a schematic circuit engineering drawing of the heating element of FIG. 2a.

DETAILED DESCRIPTION

Figure 1:
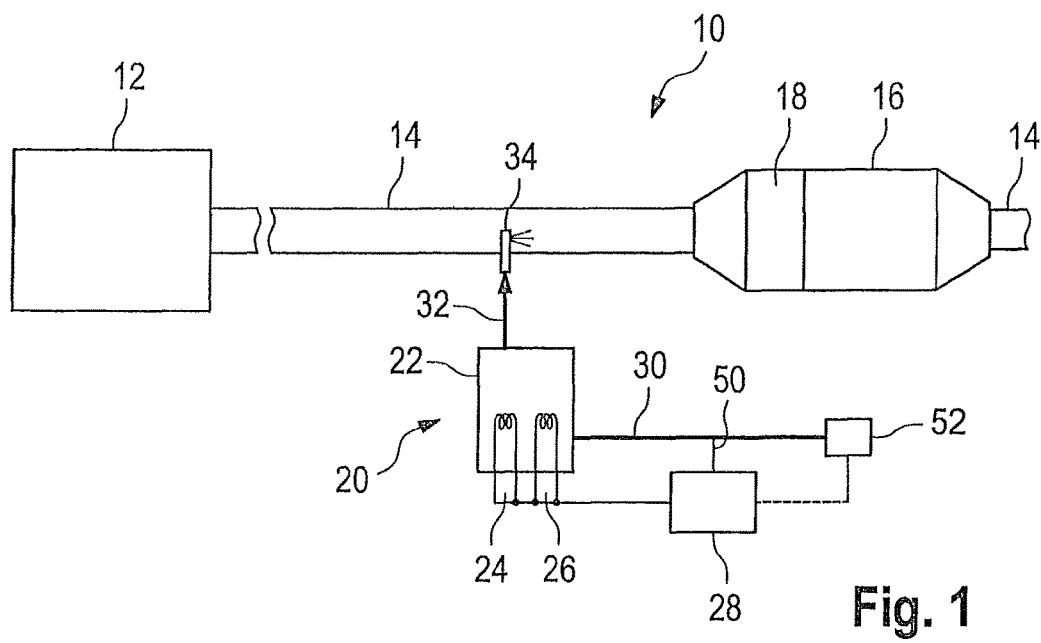
FIG. 1 shows a schematic view of a vehicle exhaust system which has an exhaust gas purification device that is regenerated in accordance with the method according to the invention and that is fitted with the vaporizer according to the invention.

FIG. 1 schematically illustrates an exhaust system 10 of an internal combustion engine 12 which, more particularly, is a diesel engine or a gasoline direct injection engine. The exhaust system 10 includes an exhaust pipe 14 which accommodates a particulate filter 16 having an oxidation catalytic converter 18 connected upstream.

Arranged upstream of the oxidation catalytic converter 18 is a vaporizer 20 which includes a vaporizer chamber 22 into which one or more heating elements 24, 26 protrude.

According to the embodiment shown, the heating elements 24, 26 are electric heating elements which are connected to a controller 28.

The one or more heating elements 24, 26 are preferably adapted to be driven individually by the controller 28.

In the illustrated embodiment, the heating elements 24, 26 are operated electrically and are symbolically shown as coils for function's sake only.

A pipe 30 feeds an oxidizable liquid, more specifically fuel, into the vaporizer chamber 22.

The liquid is heated up and vaporized in the vaporizer chamber 22, the vapor then being supplied to the exhaust gas flow via a pipe 32 and a nozzle 34 protruding into the exhaust pipe 14 in regeneration phases of the filter 16.

Figure 2A:
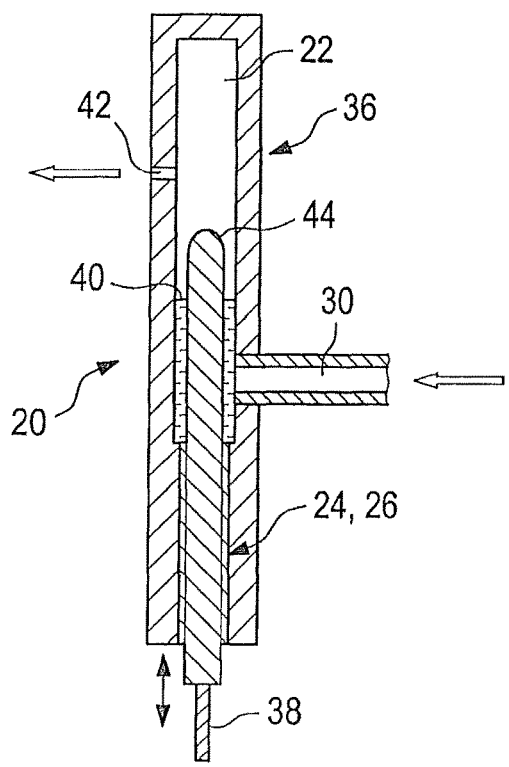
FIG. 2a shows a schematic cross-sectional view of a vaporizer according to the invention.

FIG. 2a illustrates one possible embodiment of the electric heating element 24, 26. The heating element 24, 26 includes a glow plug that is surrounded by a housing 36. The glow plug is provided with an electrical connection 38 leading to the controller 28.

The liquid supplied stands in the vaporizer chamber 22 up to a specific variable level 40. Above the level 40, the chamber 22 is filled with vapor that flows via the opening 42 to the feeding pipe 32.

The glow plug includes one or more coils, where a plurality of coils forms a plurality of heating elements 24, 26. Alternatively or additionally, a plurality of such heating elements 24, 26 may, of course, also project into a common vaporizer chamber 22.

Figure 2B:
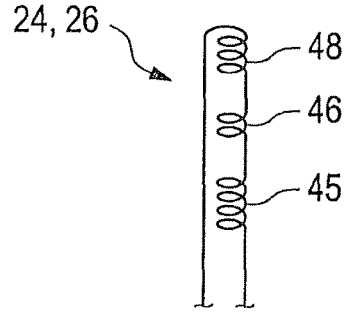

FIG. 2b shows a circuit engineering illustration of the heating element 24, 26, which includes a first heating coil 45, a subsequent control coil 46, and another, second heating coil 48 subsequent thereto.

In order to prevent an outer surface 44 from coking caused by the vaporizing liquid, the temperature on the surface 44 of the heating element 24, 26 is limited to a maximum value of 700 to 750° C. Below this limiting value, either no coking will occur at all (below approximately 700° C.), or only very little coking will occur (above approximately 700° C. up to a maximum of 750° C.).

To limit this surface temperature, several options are available, only some of which will be presented below. The presented versions may, of course, be combined with each other as desired and with other variants that are not presented, in order to reach the aim of not exceeding the maximum temperature.

For example, the controller 28 may be coupled to a flow sensor 50 (see FIG. 1), which leads into the supply pipe 30 and determines the mass flow of the liquid. As an alternative, it is, of course, also conceivable that a pump 52 used for delivering the liquid into the vaporizer chamber 22 is coupled to the controller 28, so that in this case, too, the amount of liquid supplied to the vaporizer chamber 22 is known. The electrical energy supplied could also be determined using a characteristic map which takes the amount of liquid into account, for example.

A further embodiment makes provision that a measuring element is arranged in the vaporizer chamber 22, which is used for determining the amount of liquid in the vaporizer chamber 22.

The resistance of the electric heating element 24, 26 may, of course, also be used for determining the temperature.

In the embodiment according to FIG. 2b, the control coil 46 is configured in such a way that it has different resistances as a function of the temperature. For instance, the control coil can change its resistance relatively abruptly at a particular temperature, so that the subsequent heating coil 48 receives less heat energy. This allows the temperature at the surface of the heating element to be controlled in an open loop or even in a closed loop.

Depending on the liquid mass flow and/or the amount of liquid contained in the vaporizer chamber 22, the one or more heating elements 24, 26 or heating coils 45, 48, for example, is/are supplied with a greater or smaller amount of energy to bring the temperature on the outer surface 44 as close as possible to the maximum temperature, which is fixed to be between 700° C. and 750° C., or up to the maximum temperature while not exceeding it.

The energy supplied may be controlled by pulse width modulation, for example.

Alternatively or additionally, it is also feasible to allow the liquid mass flow to be switched between preset, fixed values. This allows the surface temperature to be influenced since in case of too high a temperature, it can be abruptly reduced by a liquid surge.

In addition, it is possible for the mass flow to be switched between different, preset values, and it is also possible to assign amounts of electrical energy to these values. For instance, tables may be stored here, which assign to a mass flow a value for the amounts of energy supplied to the heating element or elements 24, 26.

For example, in the case of large amounts of liquid, both heating elements 24 or 26 can be fully connected; or in the case of very small amounts of liquid, only one heating element 24 or 26 can be connected. As already emphasized above, a glow plug may, of course, also include a plurality of separately switchable heating coils, each of which is considered a respective drivable heating element.

As shown in FIG. 2a, the vaporizer chamber 22 is subdivided into a lower liquid section and an upper vapor section, with the heating element or elements 24, 26 being arranged and designed in such a way that on their outer surface 44 they make more energy available in the liquid section than in the vapor section.

Figure 3:
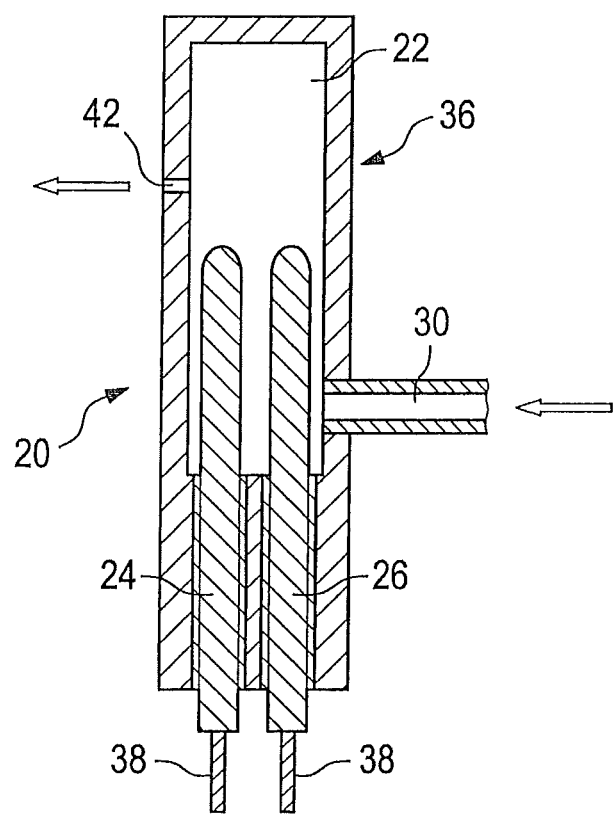
FIG. 3 shows a second embodiment of the vaporizer according to the invention.

The embodiment according to FIG. 3 substantially corresponds to the one illustrated in FIG. 2, so that only the differences will be discussed below.

In this embodiment, two heating elements 24, 26 in the form of two glow plugs are provided, which are drivable individually and project into the shared vaporizer chamber 22. Each of the two heating elements may include one or more heating coils that are drivable separately or jointly, so that two, three or more different stages of heat energy levels are available, where required.

The generation of vapor is not performed constantly, but only in so-called "regeneration phases," so that the heating devices 24, 26 start to operate only in these phases, and liquid is supplied to the vaporizer chamber 22 only in these phases.

The oxidizable liquid provides for an increase in the temperature of the exhaust gas in the oxidation catalytic converter 18, so that the particulates are burnt in the exhaust gas purification filter 16.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of regenerating an exhaust gas purification filter of an internal combustion engine using a vaporized liquid to be introduced into an exhaust gas flow, comprising by the steps of:
   providing at least one heating element positioned in a vaporizer chamber, wherein the at least one heating element includes at least one heating coil;
   feeding a liquid into the vaporizer chamber;
   heating up and vaporizing the liquid with the at least one heating element;
   controlling a surface temperature of the at least one heating element, in an operating condition, within a range of 700° C. to 750° C.;
   supplying energy to the at least one heating element as a function of an amount of liquid present in the vaporizer chamber and/or of liquid mass flow delivered through the vaporizer chamber; and
   heating up and vaporizing the liquid without igniting the liquid.

2. The method according to claim 1, wherein the liquid is fuel.

3. The method according to 1, wherein the at least one heating element is a glow plug that is within the vaporizer chamber, and wherein the vaporizer chamber is downstream from the internal combustion engine and upstream of the exhaust gas purification filter.

4. The method according to claim 1, including controlling an amount of energy supplied to the at least one heating element with pulse width modulation.

5. The method according to claim 1, including switching the liquid mass flow introduced into the vaporizer chamber between preset fixed values.

6. The method according to claim 1, including dividing the vaporizer chamber into a liquid section and a vapor section, and configuring the at least one heating element to have an outer surface that makes more energy available in the liquid section than in the vapor section.

7. The method according to claim 1, wherein the at least one heating element includes a control coil connected upstream of the heating coil.

8. The method according to claim 7, wherein the control coil changes resistance at a specific temperature.

9. The method according to claim 7, including connecting an electronic controller to the control coil with at least one electrical connection such that the electronic controller controls the control coil to vary resistance in relation to the temperature.

10. The method according to claim 7, wherein the heating element further comprises a second heating coil downstream of the control coil, and wherein the control coil is configured to have different resistances as a function of temperature.

11. The method according to claim 1, wherein the at least one electrical heating element includes a plurality of heating wires which are adapted to be driven differently for controlling the surface temperature.

12. A method of regenerating an exhaust gas purification filter of an internal combustion engine using a vaporized liquid to be introduced into an exhaust gas flow, comprising by the steps of:
   providing at least one electric heating element positioned in a vaporizer chamber, wherein the at least one electric heating element includes at least one heating coil;
   feeding a liquid into the vaporizer chamber;
   heating up and vaporizing the liquid with the at least one electric heating element;
   controlling a surface temperature of the at least one electric heating element, in an operating condition, within a range of 700° C. to 750° C.,
   controlling the at least one electric heating element based on an amount of liquid supplied to the vaporizer chamber by a pump; and
   heating up and vaporizing the liquid without igniting the liquid.

13. A vaporizer of a vehicle exhaust gas purification device comprising:
   a vaporizer chamber that receives a liquid;
   at least one electrical heating element positioned in the vaporizer chamber to heat the liquid;
   a controller configured to control surface temperature of the at least one electrical heating element within a range of 700° C. to 750° C.;
   the controller configured to supply energy to the at least one heating element as a function of an amount of liquid present in the vaporizer chamber and/or of liquid mass flow delivered through the vaporizer chamber; and
   the controller configured to heat up and vaporize the liquid without igniting the liquid.

14. The vaporizer according to claim 13, wherein the controller comprises an electronic controller which includes at least one electrical connection to the at least one electrical heating element.

15. The vaporizer according to claim 13, wherein the at least one electrical heating element includes at least one heating coil and a control coil connected upstream of the heating coil.

16. The vaporizer according to claim 15, wherein the control coil is configured to have different resistances as a function of temperature.

17. The vaporizer according to claim 13, wherein the vaporizer chamber is subdivided into a liquid section and a vapor section, and wherein the at least one electrical heating element has an outer surface that makes more energy available in the liquid section than in the vapor section.

18. The vaporizer according to claim 13, wherein the at least one electrical heating element includes a plurality of heating wires which are adapted to be driven differently for controlling the surface temperature.

19. The vaporizer according to claim 13, wherein the at least one electrical heating element is a glow plug that is within the vaporizer chamber, and wherein the vaporizer chamber is downstream from an internal combustion engine and upstream of the vehicle exhaust gas purification device.

* * * * *